United States Patent
Love

(10) Patent No.: US 8,521,950 B2
(45) Date of Patent: Aug. 27, 2013

(54) BOOTING AN OPERATING SYSTEM FROM A VIRTUAL HARD DISK

(75) Inventor: Shannon Andrew Love, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 11/566,976

(22) Filed: Dec. 5, 2006

(65) Prior Publication Data

US 2008/0133902 A1    Jun. 5, 2008

(51) Int. Cl.
*G06F 12/00* (2006.01)
*G06F 9/00* (2006.01)
*G06F 11/00* (2006.01)

(52) U.S. Cl.
USPC .................................. 711/104; 713/2; 714/54

(58) Field of Classification Search
USPC .................................. 711/104; 713/2; 714/54
See application file for complete search history.

(56) References Cited

U.S. PATENT DOCUMENTS

| | | | |
|---|---|---|---|
| 5,381,462 A * | 1/1995 | Larson et al. | 379/106.06 |
| 5,430,858 A | 7/1995 | Greeley et al. | |
| 5,493,574 A | 2/1996 | McKinley | |
| 5,594,903 A | 1/1997 | Bunnell et al. | |
| 6,079,026 A * | 6/2000 | Berglund et al. | 713/340 |
| 6,243,504 B1 * | 6/2001 | Kruppa | 382/318 |
| 6,934,881 B2 | 8/2005 | Gold et al. | |
| 2002/0194394 A1 | 12/2002 | Chan | |
| 2003/0070110 A1 * | 4/2003 | Aija et al. | 714/4 |
| 2004/0073783 A1 | 4/2004 | Ritchie | |
| 2004/0210716 A1 | 10/2004 | Chuang | |
| 2004/0243795 A1 * | 12/2004 | Hsu et al. | 713/2 |
| 2005/0177829 A1 * | 8/2005 | Vishwanath | 717/177 |
| 2005/0210228 A1 | 9/2005 | Miller et al. | |

\* cited by examiner

*Primary Examiner* — Reginald Bragdon
*Assistant Examiner* — Mehdi Namazi
(74) *Attorney, Agent, or Firm* — Yee & Associates, P.C.; Tom Tyson

(57) ABSTRACT

A system for booting an operating system from a virtual hard disk. A partitioned memory segment is formed within a memory by a preconfigured amount. A boot application is loaded into the partitioned memory segment to form a virtual hard disk. In response to determining that the virtual hard disk contains an operating system, the operating system is booted from the virtual hard disk.

18 Claims, 4 Drawing Sheets

BOOTING AN OPERATING SYSTEM FROM A VIRTUAL HARD DISK

BACKGROUND OF THE INVENTION

1. Field of the Invention

The present invention relates generally to an improved data processing system. More specifically, the present invention is directed to a computer implemented method, system, and computer usable program code for booting an operating system from a virtual hard disk.

2. Description of the Related Art

The rapid development of information technology has lead to an increasing use of computers by individuals and businesses. As a result, computers are a ubiquitous tool for both personal and work related tasks. Conventionally, booting a computer refers to a process of running a basic input output system (BIOS) to detect system and peripheral components and loading an operating system (OS) into random access memory (RAM) from a physical hard disk for execution. The physical hard disk is a permanent, or non-volatile, data storage location, whereas the RAM is an impermanent, or volatile, data storage location. Volatile means that data contained within the RAM is lost when power is removed from the RAM.

Physical hard disks are relatively slow because physical disks have mechanical parts that allow for seeking to a particular position on the magnetic storage media to read and write data. In addition, physical hard disks are prone to mechanical failure, especially when the physical hard disk is subject to strong vibrations. One example of a hostile environment to physical hard disks is a point of sale device, such as a cash register system, which locates the physical hard disk above a cash drawer. The impact of the cash drawer opening and closing, as well as other impacts, such as breaking open rolls of coins on the cash drawer, vibrates the physical hard disk increasing failure rates.

Because physical hard disks have a high failure rate in environments where vibration is a problem, users may prefer solid-state systems, such as RAM chips. However, existing solid-state technologies either rely on flash RAM or battery-backed RAM chips. Writing to flash RAM chips is slow and the number of times data may be written to flash RAM chips is limited. Also, battery-backed RAM chips are generally very expensive.

A RAM virtual hard disk is a memory-resident program which mimics a physical hard disk using part of the computer's RAM to store data for faster access. A RAM virtual hard disk, in some cases, may read and write the same data thirty to sixty times faster than a physical hard disk. Because the OS is essential for running all other programs and applications residing in a computer or other type of data processing system, such as a point of sale device, it is essential to boot the OS as quickly as possible in some instances to reduce down time. However, the OS is not currently able to boot from the virtual hard disk. Booting the OS from the virtual hard disk may provide an extremely fast system boot, thus reducing system down time.

Therefore, it would be beneficial to have an improved computer implemented method, system, and computer usable program code for booting an operating system from a virtual hard disk, which is implemented in RAM.

BRIEF SUMMARY OF THE INVENTION

Illustrative embodiments provide a computer implemented method, system, and computer usable program code for booting an operating system from a virtual hard disk. A partitioned memory segment is formed within a memory by a preconfigured amount. A boot application is loaded into the partitioned memory segment to form a virtual hard disk. In response to determining that the virtual hard disk contains an operating system, the operating system is booted from the virtual hard disk.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
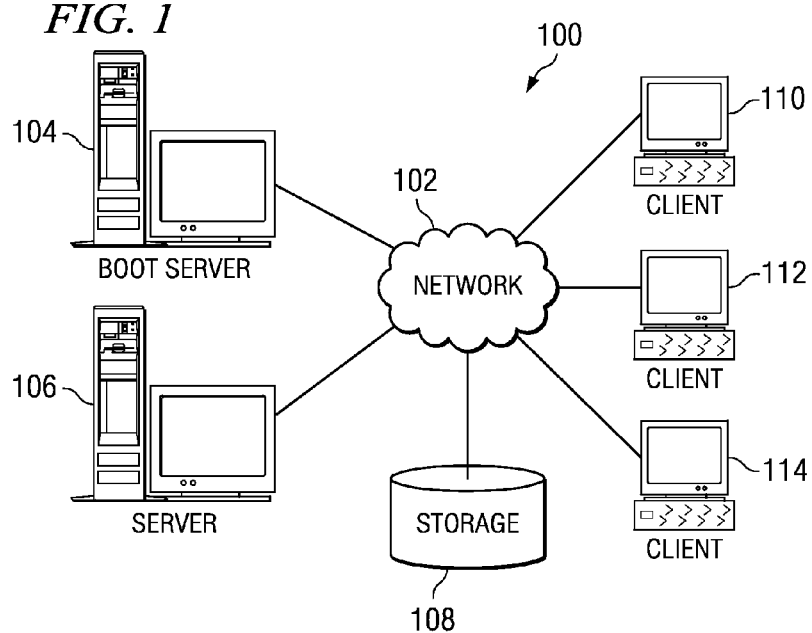
FIG. 1 is a pictorial representation of a network of data processing systems in which illustrative embodiments may be implemented.
Figure 2:
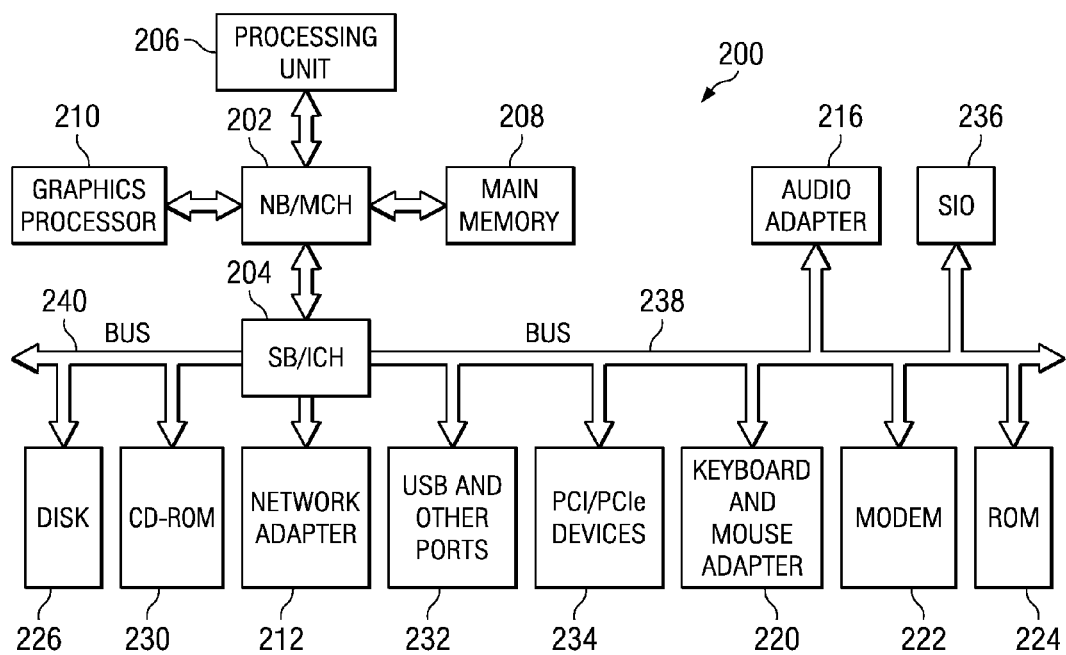
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers and other devices, such as point of sale devices, in which illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, boot server 104 and server 106 connect to network 102 along with storage unit 108. In addition, clients 110, 112, and 114 connect to network 102. Clients 110, 112, and 114 may, for example, be personal computers, network computers, or point of sale devices.

A point of sale device captures data at the time and place of a sale. Point of sale systems use computers or specialized terminals that are combined with cash registers, bar code readers, optical scanners, and magnetic stripe readers for accurately and instantly capturing a transaction. Point of sale systems may be online to a central computer for credit checking and inventory updating or the point of sale device may be a stand-alone machine that stores daily transactions until the transactions can be downloaded or transmitted to the central computer for processing.

In the depicted example, boot server 104 provides data, such as boot files, network bootstrap programs, operating system images, and applications to clients 110, 112, and 114. Clients 110, 112, and 114 are clients to boot server 104 in this example. Network data processing system 100 may include additional servers, clients, and other devices not shown. Further, network data processing system 100 may include a preboot execution environment. A preboot execution environment provides an environment for bootstrapping computers, such as clients 110, 112, and 114, from boot server 104 via network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as boot server 104 or client 110 in FIG. 1, in which computer usable code or instructions implementing the processes may be located for illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for booting an operating system from a virtual hard disk. A memory partition manager unit forms a partitioned memory segment within a memory by a preconfigured amount. The memory is RAM within a data processing system. The data processing system may, for example, be a point of sale device or computer. The memory partition manager unit loads a boot application into the partitioned memory segment to form a virtual hard disk. The boot application may, for example, include a BIOS and an OS. In response to determining that the virtual hard disk contains an operating system, the data processing system boots the OS from the virtual hard disk.

In addition, illustrative embodiments provide an integrated uninterruptible power supply to the partitioned memory segment to protect and maintain data within the virtual hard disk in the event of a main power failure. The memory partition manager unit monitors the energy level of the integrated uninterruptible power supply on a predetermined periodic basis. If the memory partition manager unit determines that the energy level of the integrated uninterruptible power supply is below a threshold, the memory partition manager unit sends an alert message, which includes predictive virtual hard disk failure information, to a user. Also, the partition manager unit signals the OS that failure of the virtual hard disk is imminent.

Furthermore, illustrative embodiments provide a method to protect the virtual hard disk in the event of a system reset or reboot. In response to receiving a reset or reboot input, the memory partition manager unit performs a modified memory reset procedure to protect the virtual hard disk within the partitioned memory segment. The modified memory reset procedure resets all of the RAM within the data processing system except the partitioned memory segment.

Thus, data processing systems that utilize illustrative embodiments may boot and reboot the OS without reloading the OS into RAM from ROM. As a result, data processing systems that utilize illustrative embodiments may experience extremely fast system boot and reboot times, thus increasing system performance. In addition, data processing systems that utilize illustrative embodiments may decrease physical hard disk failure rates. Moreover, illustrative embodiments may not require a physical hard drive. Consequently, illustrative embodiments may lower data processing system hardware costs.

Figure 3:
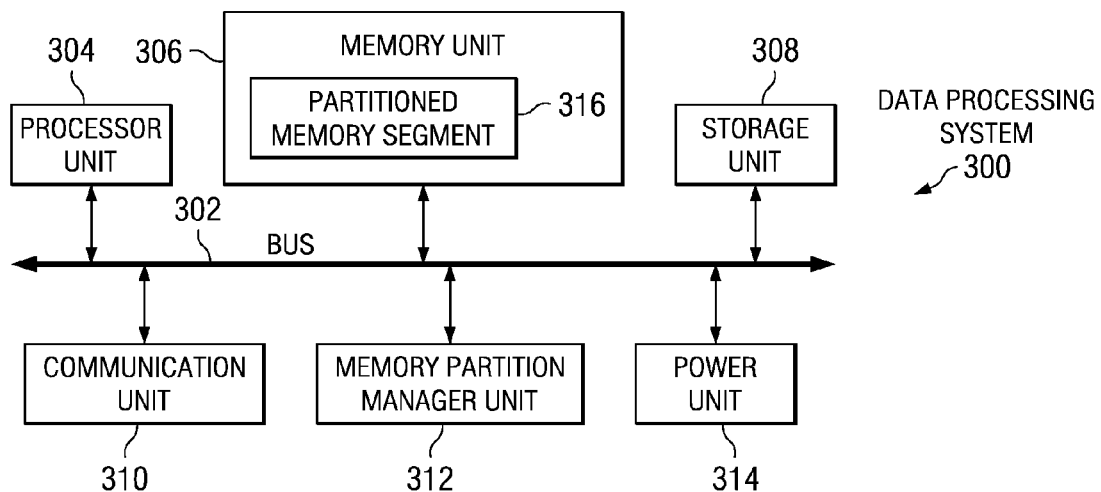
FIG. 3 is a block diagram of a data processing system in accordance with an illustrative embodiment.

With reference now to FIG. 3, a block diagram of a data processing system is depicted in accordance with an illustrative embodiment. Data processing system 300 may, for example, be implemented in client 110 in FIG. 1 and data processing system 200 in FIG. 2. In this illustrative example of FIG. 3, data processing system 300 utilizes a bus architecture, such as bus 302. Bus 302 may, for example, be bus 238 in FIG. 2. Bus 302 may include one or more buses. In addition, bus 302 may be implemented using any type of communication fabric or architecture that provides for a transfer of data between the different components and devices coupled to bus 302.

Data processing system 300 includes processor unit 304, memory unit 306, storage unit 308, communication unit 310, memory partition manager unit 312, and power unit 314 connected to bus 302. However, it should be noted that data processing system 300 is only shown for exemplary purposes and is not meant as an architectural limitation to illustrative embodiments. In other words, data processing system 300 may include more or fewer components as necessary to accomplish processes of illustrative embodiments for booting an OS from a virtual hard disk within a partitioned memory segment, such as partitioned memory segment 316.

Processor unit 304 provides the data processing capabilities of data processing system 300. Processor unit 304 may, for example, be processing unit 206 in FIG. 2. An OS runs on processor unit 304 and coordinates and provides control of various components within data processing system 300. In addition, software applications executing on data processing system 300 may run in conjunction with the OS.

Storage unit 308 is a non-volatile data storage device that may, for example, be configured as ROM, such as ROM 224 in FIG. 2, and/or flash ROM to provide the non-volatile memory for storing the OS and other data, such as a boot application. However, it should be noted that illustrative embodiments are not restricted to utilizing storage unit 308. In other words, storage unit 308 is optional because illustrative embodiments may not require the functionality of a physical hard disk and/or flash ROM.

The boot application includes data, code, or instructions to boot a data processing system, such as data processing system 300. The boot application may, for example, include a BIOS and an OS. BIOS is an essential set of routines that provide an interface between the OS and the data processing system hardware. BIOS supports all peripheral technologies including drives. Upon system startup, or system boot, BIOS prepares the data processing system for operation by querying its configuration settings. Afterward, BIOS passes control to the OS.

Storage unit 308 stores instructions or computer usable program code for the OS, boot application, and other applications. The instructions are loaded into memory unit 306 for execution by processor unit 304. Processor unit 304 performs processes of illustrative embodiments by executing the computer usable program code that is loaded into memory unit 306. Memory unit 306 may, for example, be main memory 208 in FIG. 2.

Further, memory unit 306 is RAM. Furthermore, memory unit 306 includes partitioned memory segment 316. Partitioned memory segment 316 is a segment, sector, or section of memory unit 306, which is partitioned or separated from the rest of the RAM in memory unit 306. This partitioning of memory unit 306 provides dedicated memory space for partitioned memory segment 316. Illustrative embodiments use partitioned memory segment 316 to create a virtual hard disk for storing system boot data, such as the boot application, which contains an OS. As a result, illustrative embodiments may boot the OS from the virtual hard disk within partitioned memory segment 316 by using the data contained in the boot application. By placing the boot application within partitioned memory segment 316, execution of the boot application by processor unit 304 is much faster. As a result, data processing system 300 boot time is much shorter.

Data processing system 300 uses communication unit 310 to communicate with other data processing systems, such as boot server 104 in FIG. 1, via a network, such as network 102 in FIG. 1. Communication unit 310 may include one or more devices used to transmit and receive data. For example, communication unit 310 may include a network adapter and/or a modem, such as, for example, network adapter 212 and modem 222 in FIG. 2, to send and receive wire and wireless transmissions. Data processing system 300 may utilize communication unit 310 to download, for example, a network bootstrap program via the network from the boot server into partitioned memory segment 316.

Data processing system 300 uses memory partition manager unit 312 to manage the RAM within memory unit 306 by partitioning the RAM to form partitioned memory segment 316. In addition, data processing system 300 uses memory partition manager unit 312 to manage loading of the boot application into partitioned memory segment 316 from storage unit 308 and/or downloading of the network bootstrap program into partitioned memory segment 316 from the boot server. Moreover, data processing system 300 uses memory partition manager unit 312 to manage power unit 314.

It should be noted that a user of data processing system 300 may enable and disable memory partition manager unit 312 independently of other components of data processing system 300. Further, it should be noted that memory partition manager unit 312 may be implemented entirely as software, hardware, or a combination of software and hardware components. Furthermore, even though the exemplary illustration of FIG. 3 depicts data processing system 300 to include memory partition manager unit 312, memory partition manager unit 312 may, for example, reside in another data processing system, such as the boot server.

Data processing system 300 uses power unit 314 to supply power to data processing system 300. However, it should be noted that power unit 314 may be one of a plurality of power units that supply power to data processing system 300. In addition, illustrative embodiments may dedicate all or only a portion of the power output from power unit 314 directly to a segment of memory unit 306. In particular, power unit 314 may, for example, be dedicated to only supply power to partitioned memory segment 316.

Power unit 314 may, for example, be an integrated uninterruptible power supply. The term "integrated" means the data processing system 300 integrates, or incorporates, power unit 314 within data processing system 300. The term "uninterruptible" means that the power output of power unit 314 continues during a main power outage to data processing system 300. In other words, external factors may not suspend or disrupt power to whatever data processing system 300 component(s) power unit 314 supplies. Thus, data processing system 300 may use power unit 314 to maintain or preserve data contained within partitioned memory segment 316 during main power outages. Power unit 314 may, for example, represent a battery, a series of batteries, a backup generator, or a combination thereof.

Figure 4:
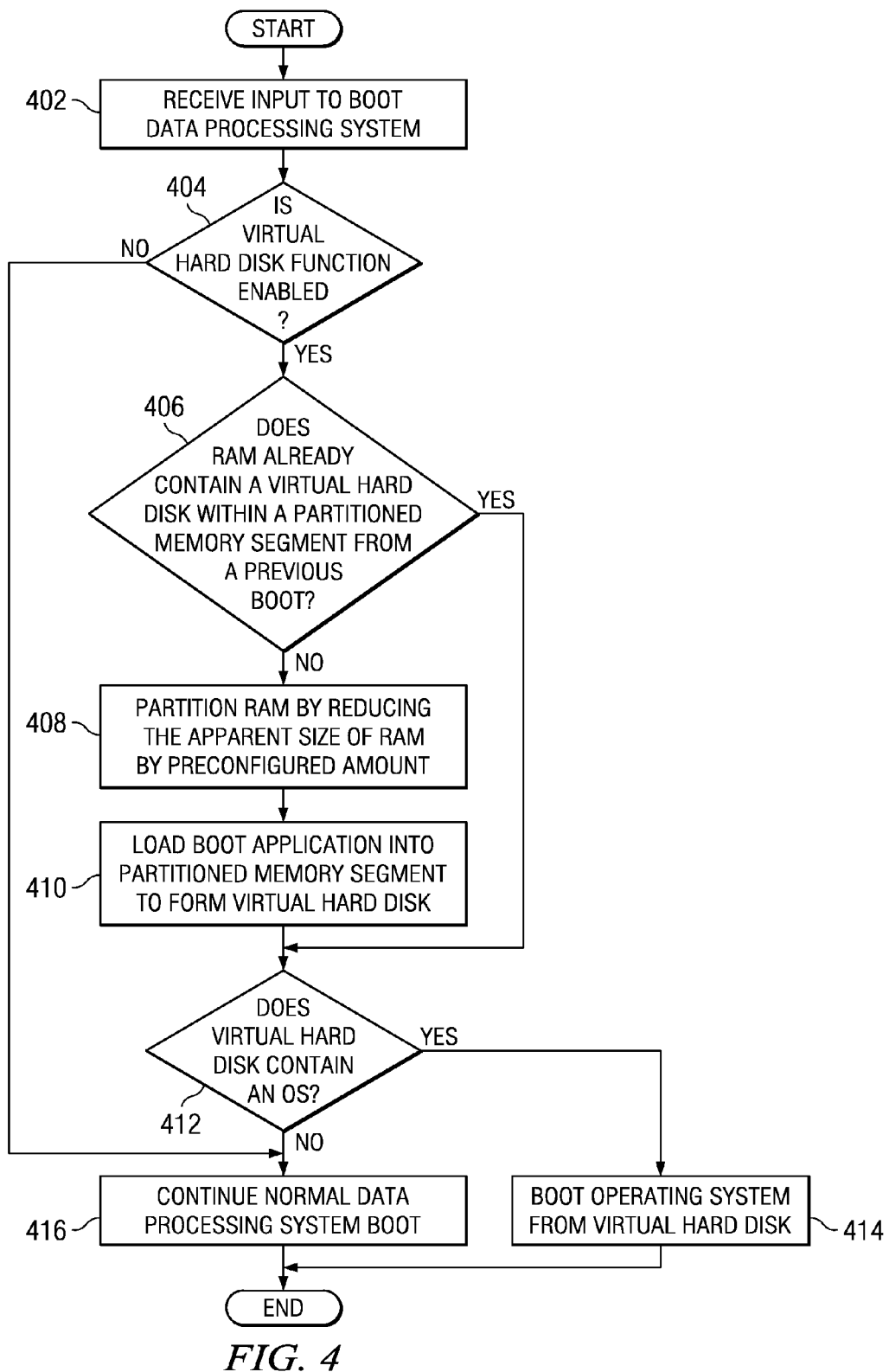
FIG. 4 is a flowchart illustrating an exemplary process for booting an operating system from a virtual hard disk in accordance with an illustrative embodiment.

With reference now to FIG. 4, a flowchart illustrating an exemplary process for booting an operating system from a virtual hard disk is shown in accordance with an illustrative embodiment. The process shown in FIG. 4 may be implemented in a data processing system, such as, for example, data processing system 300 in FIG. 3.

The process begins when the data processing system receives an input from a user, such as, for example, a system administrator, to boot the data processing system (step 402). Alternatively, the data processing system may receive the system boot input from another data processing system, such as, for example, boot server 104 in FIG. 1. Subsequent to receiving the input to boot the data processing system in step 402, the data processing system makes a determination as to whether a virtual hard disk function is enabled (step 404).

If the data processing system determines that the virtual hard disk function is not enabled, no output of step 404, then the process proceeds to step 416 where the data processing system continues normal boot procedures. If the data processing system determines that the virtual hard disk function is enabled, yes output of step 404, then the data processing system utilizes a memory partition manager unit, such as, for example, memory partition manager unit 312 in FIG. 3, to make a determination as to whether the data processing system's RAM, such as, for example, memory unit 306 in FIG. 3, already contains a virtual hard disk within a partitioned memory segment, such as, for example, partitioned memory segment 316 in FIG. 3, from a previous system boot (step 406). If the memory partition manager unit determines that the data processing system's RAM does already contain a virtual hard disk within a partitioned memory segment from a previous system boot, yes output of step 406, then the process proceeds to step 412 where the memory partition manager unit makes a determination as to whether the virtual hard disk contains an OS. If the memory partition manager unit determines that the data processing system's RAM does not already contain a virtual hard disk within a partitioned memory segment from a previous system boot, no output of step 406, then the memory partition manager unit partitions the data processing system's RAM by reducing the apparent size of the RAM by a preconfigured amount to form the partitioned memory segment (step 408).

The user of the data processing system configures the amount of apparent reduction, such as, for example, 10%, 20%, 30%, 40%, or 50%, to the data processing system's RAM to form the partitioned memory segment. However, it should be noted that the user may configure the apparent reduction of the RAM by any amount the user desires. In addition, the memory partition manager unit may reduce the apparent size of the data processing system's RAM by a default amount, such as, for example, 25%, if the user does not configure the amount of apparent reduction prior to this process occurring.

After partitioning the data processing system's RAM by reducing the apparent size of the RAM by a preconfigured amount to form the partitioned memory segment in step 408, the memory partition manager unit loads a boot application into the partitioned memory segment to form a virtual hard disk (step 410). The memory partition manager unit loads the boot application into the partitioned memory segment from, for example, a physical hard disk, such as HDD 226 in FIG. 2. Alternatively, the memory partition manager unit may, for example, download the boot application into the partitioned memory segment from the boot server. The boot application may include a BIOS and an OS. In addition, the boot application may, for example, include a network bootstrap program. Consequently, the data processing system may use the data stored within the virtual hard disk to boot.

Subsequent to loading the boot application into the partitioned memory segment to form the virtual hard disk in step 410, the memory partition manager unit makes a determination as to whether the virtual hard disk contains an OS (step 412). If the memory partition manager unit determines that the virtual hard disk does contain an OS, yes output of step 412, then the memory partition manager unit boots the OS from the virtual hard disk (step 414). The process terminates thereafter. If the memory partition manager unit determines that the virtual hard disk does not contain an OS, no output of step 412, then the data processing system continues normal boot procedures (step 416). The process terminates thereafter.

Figure 5:
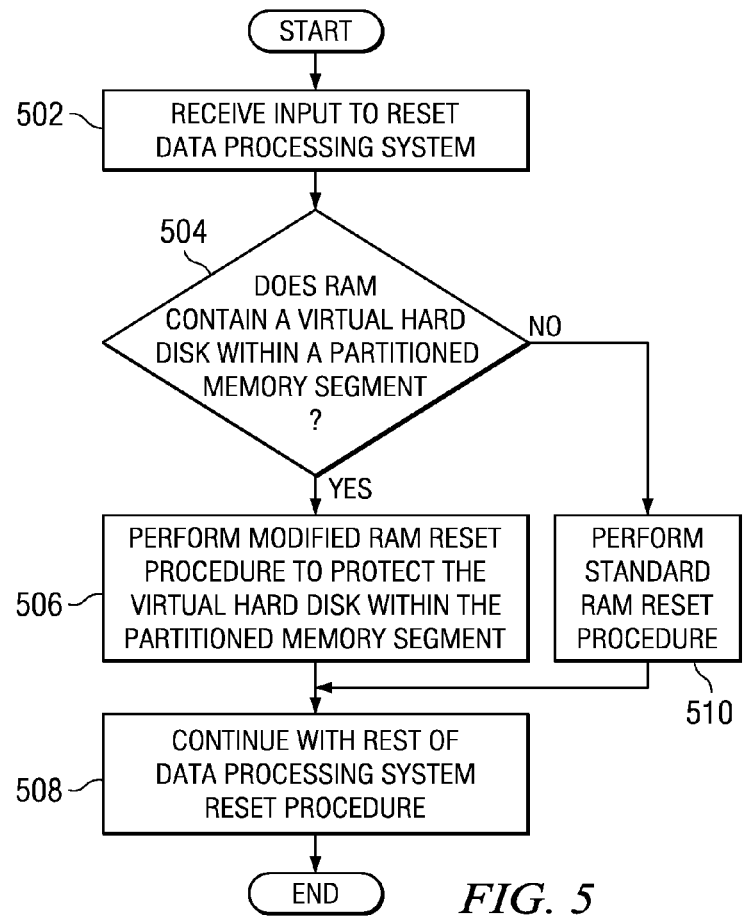
FIG. 5 is a flowchart illustrating an exemplary process for resetting data processing system RAM in accordance with an illustrative embodiment.

With reference now to FIG. 5, a flowchart illustrating an exemplary process for resetting data processing system RAM is shown in accordance with an illustrative embodiment. The process shown in FIG. 4 may be implemented in a data processing system, such as, for example, data processing system 300 in FIG. 3.

The process begins when the data processing system receives an input from a user, such as, for example, a system administrator, to reset, or reboot, the data processing system (step 502). Alternatively, the data processing system may receive the system reset or reboot input from another data processing system, such as, for example, boot server 104 in FIG. 1. Subsequent to receiving the input to reset or reboot the data processing system in step 502, the data processing system utilizes a memory partition manager unit, such as, for example, memory partition manager unit 312 in FIG. 3, to make a determination as to whether the data processing system's RAM, such as, for example, memory unit 306 in FIG. 3, contains a virtual hard disk within a partitioned memory segment, such as, for example, partitioned memory segment 316 in FIG. 3 (step 504).

If the memory partition manager unit determines that the data processing system's RAM does contain a virtual hard disk within a partitioned memory segment, yes output of step 504, then the memory partition manager unit performs a modified RAM reset procedure to protect the virtual hard disk within the partitioned memory segment. A modified RAM reset procedure is a procedure that resets all of the data processing system's RAM except the partitioned memory segment within the data processing system's RAM. As a result, the modified RAM reset procedure preserves data contained within the partitioned memory segment during a reset of the data processing system's RAM. The memory partition manager unit preserves the data within the partitioned memory segment by directing an integrated uninterruptible power supply, such as, for example, power unit 314 in FIG. 3, to maintain power to the partitioned memory segment during the modified RAM reset procedure. The integrated uninterruptible power supply may, for example, be a battery.

After the memory partition manager unit performs the modified RAM reset procedure to protect the virtual hard disk within the partitioned memory segment in step 506, the data processing system continues with the remainder of the data processing system reset procedures as usual (step 508). The process terminates thereafter.

Returning now to step 504, if the memory partition manager unit determines that the data processing system's RAM does not contain a virtual hard disk within a partitioned memory segment, no output of step 504, then the data processing system performs a standard, or normal, RAM reset procedure (step 510). Subsequent to the data processing system performing a standard RAM reset procedure in step 510, the process returns to step 508 where the data processing system continues with the remainder of the data processing system reset procedures as usual.

Figure 6:
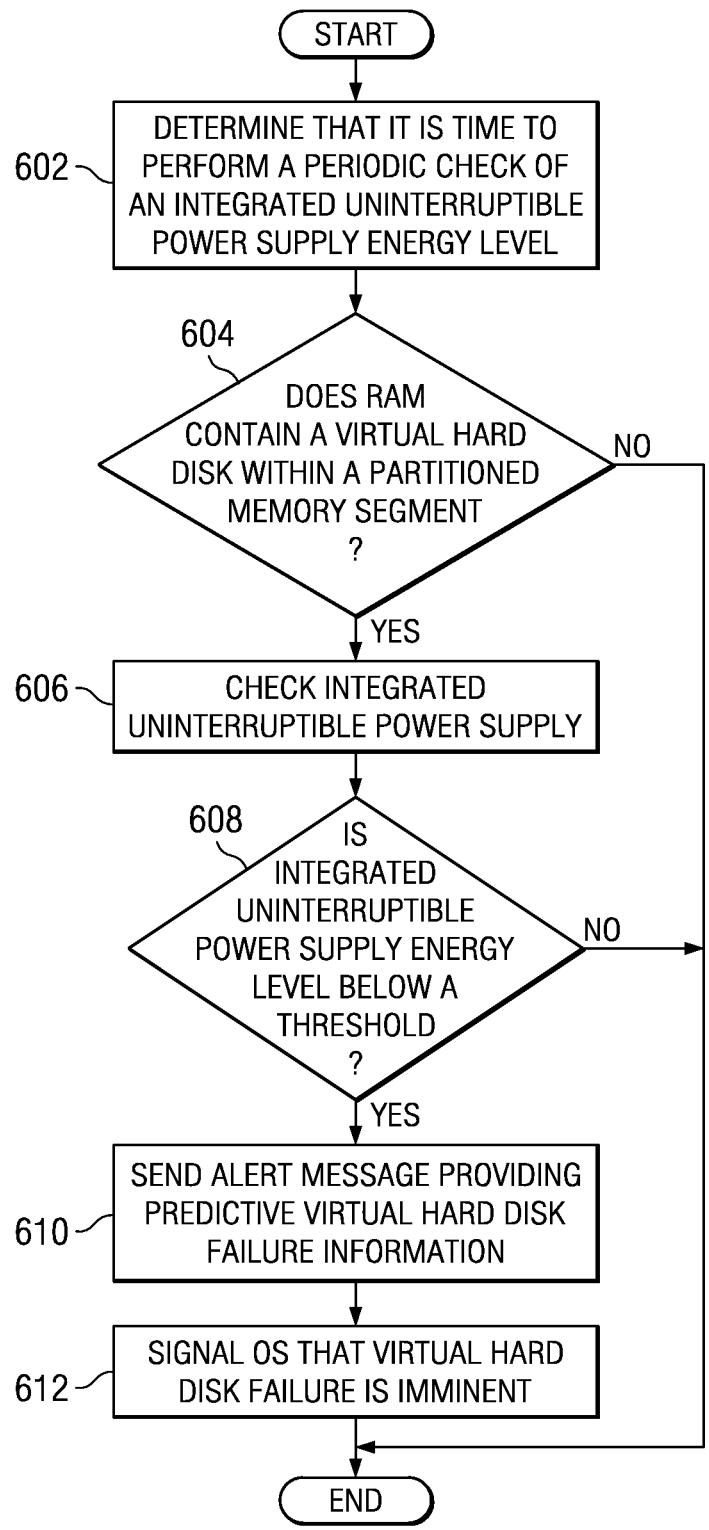
FIG. 6 is a flowchart illustrating an exemplary process for periodically checking an integrated uninterruptible power supply energy level in accordance with an illustrative embodiment.

With reference now to FIG. 6, a flowchart illustrating an exemplary process for periodically checking an integrated uninterruptible power supply energy level is shown in accordance with an illustrative embodiment. The process shown in FIG. 4 may be implemented in a memory partition manager unit, such as, for example, memory partition manager unit 312 in FIG. 3.

The process begins when the memory partition manager unit determines that it is time to perform a periodic check of an integrated uninterruptible power supply energy level (step 602). The integrated uninterruptible power supply may, for example, be a dedicated power supply device, such as a battery. The memory partition manager unit may perform the periodic check of the integrated uninterruptible power supply energy level, for example, once every minute, 15 minutes, 30 minutes, 60 minutes, or 24 hours. Of course, those of ordinary skill in the art will appreciate that illustrative embodiments may utilize any time interval to perform the periodic check of the integrated uninterruptible power supply energy level.

Subsequent to determining that it is time to perform a periodic check of the integrated uninterruptible power supply energy level in step 602, the memory partition manager unit makes a determination as to whether a data processing system's RAM, such as, for example, memory unit 306 in FIG. 3, contains a virtual hard disk within a partitioned memory segment, such as, for example, partitioned memory segment 316 in FIG. 3 (step 604). If the memory partition manager unit determines that the data processing system's RAM does not contain a virtual hard disk within a partitioned memory segment, no output of step 604, then the process terminates thereafter. If the memory partition manager unit determines that the data processing system's RAM does contain a virtual hard disk within a partitioned memory segment, yes output of step 604, then the memory partition manager unit checks the integrated uninterruptible power supply energy level (step 606).

After checking the integrated uninterruptible power supply energy level in step 606, the memory partition manager unit makes a determination as to whether the integrated uninterruptible power supply energy level is below a threshold (step 608). The integrated uninterruptible power supply energy level threshold may, for example, be set at 20%, 15%, 10%, or 5% of the remaining power within the integrated uninterruptible power supply. If the integrated uninterruptible power supply energy level is not below the threshold, no output of step 608, then the process terminates thereafter. If the integrated uninterruptible power supply energy level is below the threshold, yes output of step 608, then the memory partition manager unit sends an alert message, which provides predictive virtual hard disk failure information, to the user (step 610). Subsequent to, or concurrently with, sending the alert message to the user in step 610, the memory partition manager unit signals the OS that failure of the virtual hard disk is imminent (step 612). The process terminates thereafter.

Thus, illustrative embodiments provide a computer implemented method, system, and computer usable program code for booting an operating system from a virtual hard disk. The invention can take the form of an entirely hardware embodiment, an entirely software embodiment or an embodiment containing both hardware and software elements. In a preferred embodiment, the invention is implemented in software, which includes but is not limited to firmware, resident software, microcode, etcetera.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk, and an optical disk. Current examples of optical disks include compact disk read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for booting an operating system from a virtual hard disk, the computer implemented method comprising:
    forming, by a memory partition manager unit, a first partitioned memory segment within a random access memory by a preconfigured amount, wherein the random access memory receives power from an integrated uninterruptible power supply, and wherein the memory partition manager unit is separate from the random access memory;
    loading, by the memory partition manager unit, a boot application into the first partitioned memory segment of the random access memory to form the virtual hard disk;
    receiving an input to boot the operating system;
    responsive to receiving the input to boot the operating system, determining if the virtual hard disk of the random access memory contains the operating system;
    responsive to determining that the virtual hard disk of the random access memory contains the operating system, booting the operating system from the virtual hard disk;
    determining, by the memory partition manager unit, whether an energy level of the integrated uninterruptible power supply is below a threshold;
    responsive to determining that the energy level of the integrated uninterruptible power supply is below the threshold, sending, by the memory partition manager unit, an alert predicting a failure of the virtual hard disk; and
    signaling, by the memory partition manager unit, the operating system that the failure of the virtual hard disk is imminent.

2. The computer implemented method of claim 1, further comprising:
    responsive to receiving a reset input, performing a modified memory reset procedure to protect the virtual hard disk within the partitioned memory segment.

3. The computer implemented method of claim 1, wherein the random access memory resides in a data processing system.

4. The computer implemented method of claim 3, wherein the data processing system is a point of sale device.

5. The computer implemented method of claim 4, wherein the point of sale device is coupled to a network.

6. The computer implemented method of claim 5, wherein the loading step includes downloading the boot application from a boot server via the network.

7. The computer implemented method of claim 6, wherein the network utilizes a preboot execution environment.

8. The computer implemented method of claim 1, wherein the boot application includes a basic input output system and the operating system.

9. The computer implemented method of claim 1, wherein the integrated uninterruptible power supply is a battery, and wherein the battery supplies power to maintain the virtual hard disk within the partitioned memory segment.

10. A data processing system for booting an operating system from a virtual hard disk, comprising:
    a bus system;
    a storage device connected to the bus system, wherein the storage device includes a set of instructions; and
    a processing unit connected to the bus system, wherein the processing unit executes the set of instructions to form, by a memory partition manager unit, a first partitioned memory segment within a random access memory by a preconfigured amount, wherein the random access memory receives power from an integrated uninterruptible power supply, and wherein the memory partition manager unit is separate from the random access memory, to load, by the memory partition manager unit, a boot application into the first partitioned memory segment of the random access memory to form the virtual hard disk, to receive an interruption to a main power supplying power to at least a second partitioned memory segment of the random access memory while supplying power from an integrated uninterruptible power supply to the virtual hard disk, responsive to receiving the input to boot the operating system, to determine if the virtual hard disk of the random access memory contains the operating system; to boot the operating system from the virtual hard disk in response to determining that the virtual hard disk of the random access memory contains the operating system; to determine, by the memory partition manager unit, whether an energy level of the integrated uninterruptible power supply is below a threshold; responsive to determining that the energy level of the integrated uninterruptible power supply is below the threshold, to send, by the memory partition manager unit, an alert predicting a failure of the virtual hard disk; and to signal, by the memory partition manager unit, the operating system that the failure of the virtual hard disk is imminent.

11. The data processing system of claim 10, wherein the processing unit executes a further set of instructions to send an alert predicting a failure of the virtual hard disk in response to determining that an energy level of the integrated uninterruptible power supply is below a threshold, and signal the operating system that the failure of the virtual hard disk is imminent.

12. The data processing system of claim 11, wherein the processing unit executes a still further set of instructions to perform a modified memory reset procedure to protect the virtual hard disk within the partitioned memory segment in response to receiving a reset input.

13. The data processing system of claim 10, wherein the data processing system includes a memory partition manager unit.

14. A non-transitory computer usable medium having computer usable program code embodied therein for booting an operating system from a virtual hard disk, the computer usable medium comprising:
    computer usable program code configured to form, by a memory partition manager unit, a first partitioned memory segment within a random access memory by a preconfigured amount, wherein the random access memory receives power from an integrated uninterruptible power supply, and wherein the memory partition manager unit is separate from the random access memory;
    computer usable program code configured to load, by the memory partition manager unit, a boot application into the first partitioned memory segment of the random access memory to form the virtual hard disk;
    computer usable program code configured to receive an input to boot the operating system;
    computer usable program code configured, responsive to receiving the input to boot the operating system, to determine if the virtual hard disk of the random access memory contains the operating system;
    computer usable program code configured to boot the operating system from the virtual hard disk of the random access memory in response to determining that the virtual hard disk contains the operating system;

computer usable program code configured to determine, by the memory partition manager unit, whether an energy level of the integrated uninterruptible power supply is below a threshold;

computer usable program code configured, responsive to determining that the energy level of the integrated uninterruptible power supply is below the threshold, to send, by the memory partition manager unit, an alert predicting a failure of the virtual hard disk; and computer usable program code configured to signal, by the memory partition manager unit, the operating system that the failure of the virtual hard disk is imminent.

15. The non-transitory computer usable medium of claim 14, further comprising:

computer usable program code configured to send an alert predicting a failure of the virtual hard disk in response to determining that an energy level of the integrated uninterruptible power supply is below a threshold; and computer usable program code configured to signal the operating system that the failure of the virtual hard disk is imminent.

16. The non-transitory computer usable medium of claim 14, further comprising:

computer usable program code configured to perform a modified memory reset procedure to protect the virtual hard disk within the partitioned memory segment in response to receiving a reset input.

17. The non-transitory computer usable medium of claim 14, wherein the computer usable program code to load the boot application into the partitioned memory segment to form the virtual hard disk includes computer usable program code to download the boot application from a boot server via a network.

18. The non-transitory computer usable medium of claim 17, wherein the boot application is a network bootstrap program.

* * * * *